Sept. 21, 1954 A. W. KEEN 2,689,914

SYNCHRONIZING OF PULSE GENERATORS

Filed April 23, 1951 2 Sheets-Sheet 1

Inventor
ARTHUR WILLIAM KEEN
By Ralph E. Atherton
Attorney

Sept. 21, 1954 A. W. KEEN 2,689,914

SYNCHRONIZING OF PULSE GENERATORS

Filed April 23, 1951 2 Sheets-Sheet 2

Inventor
ARTHUR WILLIAM KEEN
By Ralph E. Atherton
Attorney

Patented Sept. 21, 1954

2,689,914

UNITED STATES PATENT OFFICE 2,689,914

SYNCHRONIZING OF PULSE GENERATORS

Arthur William Keen, Twickenham, England, assignor to Electric & Musical Industries Limited, Hayes, Middlesex, England, a company of Great Britain Application April 23, 1951, Serial No. 222,327

Claims priority, application Great Britain April 25, 1950

5 Claims. (Cl. 250—36)

This invention relates to the synchronising of generated pulses, or oscillations, by means of synchronising pulses. The invention relates particularly but not exclusively to means for synchronizing a pulse generator employed for generating pulses for controlling the line or frame deflection of the beam of the cathode ray tube of a television receiver wherein the synchronising pulses derived from the received signals are employed for controlling the timing of the generated pulses instead of being employed themselves for controlling the deflection of the beam.

The object of the present invention is to provide improved means for synchronising generated pulses or oscillations.

According to one aspect of the present invention there is provided an arrangement for synchronising the generation of pulses with the aid of received synchronising pulses, comprising means for generating periodical groups of pulses each comprising an intermediate pulse and two additional pulses respectively leading and lagging the intermediate pulse by equal time intervals, means for comparing the timing of the additional pulses with received synchronising pulses, and means for controlling the periodicity of the generated pulses in dependence upon the comparison in such manner as to tend to maintain the additional pulses so timed in relation to the synchronising pulses that a synchronising pulse is centrally timed with respect to the additional pulses of each group, thereby to maintain the intermediate pulses in synchronism with the synchronising pulses.

According to another aspect of the present invention there is provided a frequency control arrangement for an oscillator comprising means for generating succesive pairs of pulses having fixed time relationships with the oscillations generated by the oscillator, means for comparing the timing of received synchronising pulses with the said pairs of pulses, and means for controlling the oscillator frequency in dependence upon the comparison in such manner as to tend to maintain the pairs of pulses so timed in relation to the synchronising pulses that a synchronising pulse is centrally timed with respect to each pair of pulses.

Figure 1:
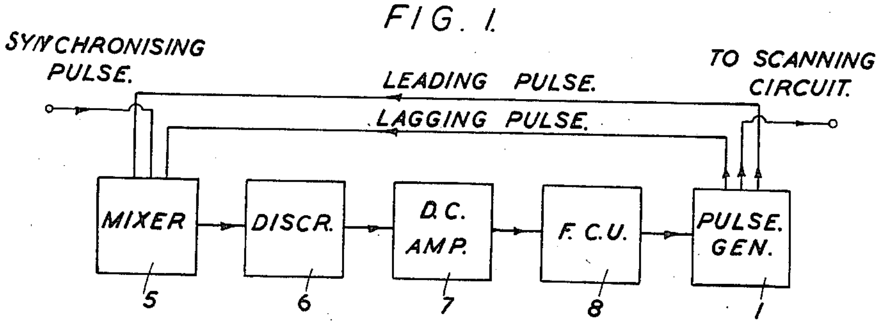
Figure 2:
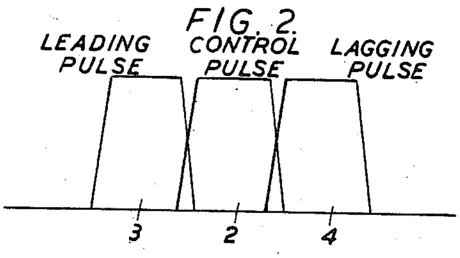
Figure 4:
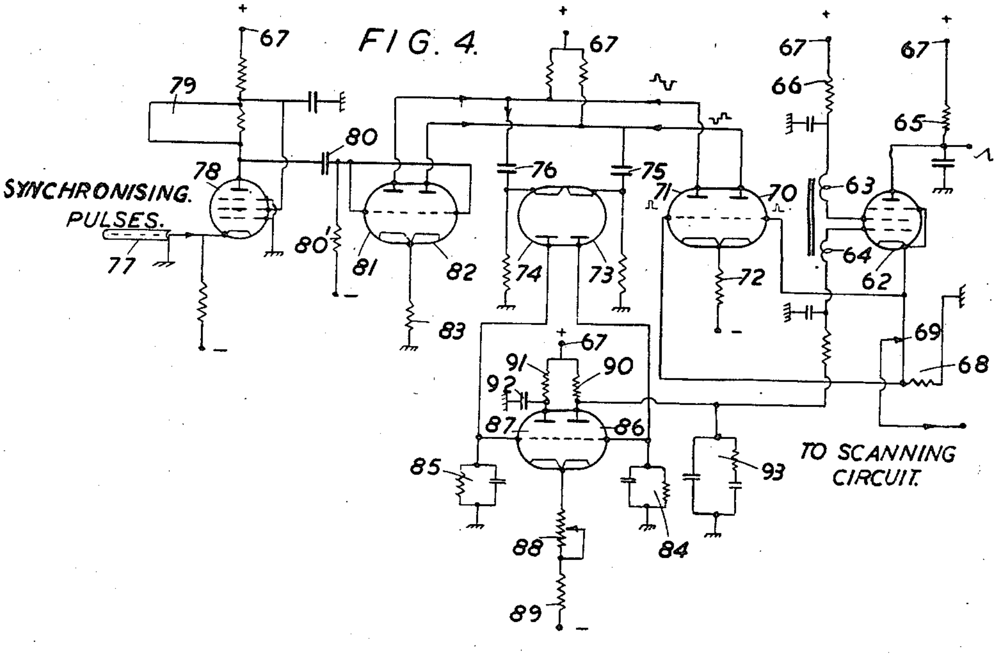
Figure 3:
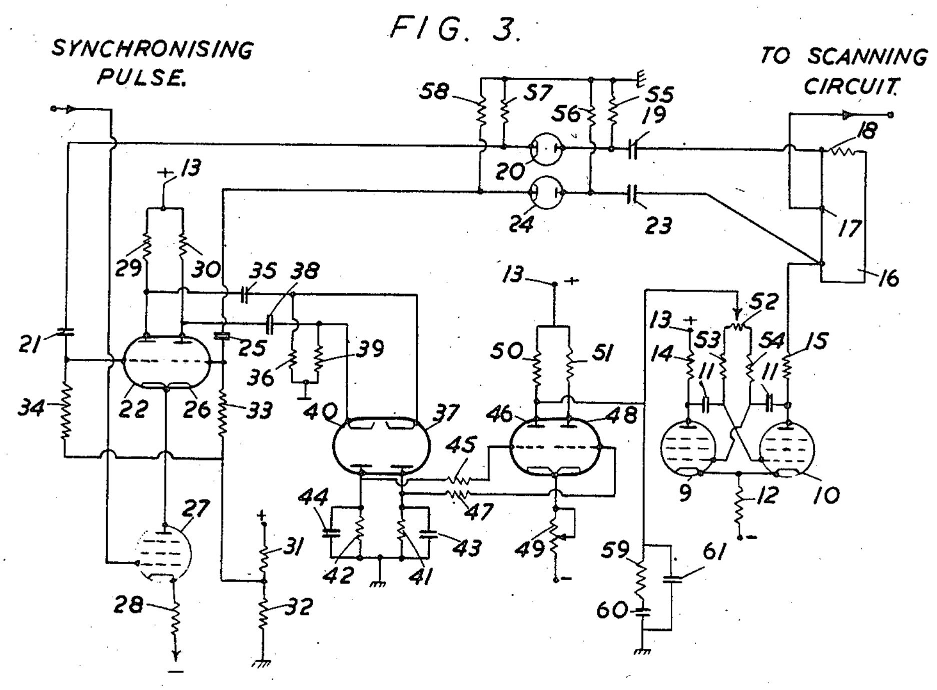

In order that the said invention may be clearly understood and readily carried into effect, the same will now be more fully described with reference to the accompanying drawings, in which:

Figure 1 is a block diagram illustrating one embodiment of the invention for synchronising the line scanning of a television receiver with received synchronising pulses, Figure 2 represents a control pulse and a pair of additional pulses, Figure 3 is a circuit diagram of a practical arrangement corresponding to Figure 1, and, Figure 4 is a circuit diagram of another practical arrangement corresponding to Figure 1.

In Figure 1 reference numeral 1 represents a pulse generator which at each operation produces three pulses of approximately equal amplitude and duration with a very small interval between them, the pulse duration being of the order of the duration of the line synchronising pulses. In Figure 2 the pulses are shown at 2, 3 and 4 respectively. The central pulse, i. e. the pulse 2, is fed to the line scanning circuit of the television receiver and serves as a control pulse to control the operation of said circuit, and the two additional pulses 3 and 4 are fed to a mixer 5 to which are also fed the line synchronising pulses derived from the received television signals. In the normal operation of the circuit, with the control pulses 2 synchronised with the synchronising pulses, the relative timing of the synchronising pulses and the additional pulses is shown by Figure 2 if the pulse 2 be regarded as the synchronising pulse, and under these conditions the waveform of the synchronising pulse is centrally located with respect to the waveform of the additional pulses 3 and 4. Under these conditions mixer 5 provides no output but in the event of the relative timing of the pulses varying, due to the frequency of generator 1 varying, the symmetrical relationship of the pulses as shown in Figure 2 will be disturbed and mixer 5 will provide an output which depends in magnitude and sign on the relative displacement of the synchronising pulse with respect to the pulses 3 and 4. It will be appreciated that such relative displacement causes one of the pulses 3 and 4, but not the other, to overlap the corresponding synchronising pulse and causes the peak level of the output of mixer 7 during one of the pulses 3 and 4 to be substantially different from the peak level during the other of the pulses 3 and 4. The output of mixer 5 is applied to a discriminator 6 which provides a pulse output corresponding in magnitude and sign to the displacement and the output of discriminator 6 is applied to a D. C. amplifier 7 which develops a continuous voltage which varies in magnitude in accordance with the magnitude of the applied pulse. The output of amplifier 7 is fed to a frequency controlling circuit 8 which includes a response control network (for example an integrator) and the output of circuit 8 is applied to generator 1 so as to increase or reduce the frequency of generator 1 as required in order to restore the symmetrical pulse relationship shown in Figure 2.

Referring now to Figure 3, the practical circuit shown therein includes a multivibrator which corresponds to the pulse generator 1 of Figure 1, the said multivibrator comprising a pair of electron discharge tubes 9 and 10, the anode of each tube being connected to the control electrode of the other tube via a condenser 11 and the cathodes being connected to a point of negative voltage via a common resistor 12. The anode of tube 9 is connected to positive H. T. terminal 13 via a resistor 14 and the anode of tube 10 is connected via a resistor 15 to a delay line 16 which is provided with a tapping 17. Tapping 17 is connected to the line scanning circuit of the receiver and the end 18 of the line 16 is connected via a condenser 19 to the anode of a diode 20 the cathode of which is connected via a condenser 21 to the control electrode of an electron discharge tube 22. The point at which the resistor 15 is connected to the delay line 16 is connected via a condenser 23 to the anode of a diode 24 the cathode of which is connected via a condenser 25 to the control electrode of an electron discharge tube 26. Tubes 22 and 26 are shown as having a common envelope and a common cathode which is connected to the anode of an electron discharge tube 27 the cathode of which is connected via a resistor 28 to the negative H. T. terminals. The anodes of tubes 22 and 26 are connected via resistors 29 and 30 respectively to the positive H. T. terminal 13. The junction of a pair of resistors 31 and 32, which are connected in series between terminal 13 and ground, is connected via a resistor 33 to the control electrode of the tube 26 and via a resistor 34 to the control electrode of tube 22, whereby suitable bias is applied to said control electrodes. The anode of tube 22 is connected via a coupling condenser 35 and a leak resistor 36 to the cathode of a diode 37 and the anode of tube 26 is connected via a coupling condenser 38 and a leak resistor 39 to the cathode of a diode 40. The anodes of diodes 37 and 40, which are shown as having a common envelope, are connected to ground via resistors 41 and 42 respectively which are shunted by condensers 43 and 44. The anode of diode 40 is connected via a resistor 45 to the control electrode of a triode 46 and the anode of diode 37 is connected via a resistor 47 to the control electrode of a triode 48. Triodes 46 and 48 have a common envelope and a common cathode which is connected via a variable resistor 49 to a point of negative voltage, and the anodes of said triodes are connected via resistors 50 and 51 respectively to positive H. T. terminal 13. The anode of triode 46 is connected to a tapping on a resistor 52 the ends of which are connected respectively via a resistor 53 to the control electrode of tube 10 and via a resistor 54 to the control electrode of tube 9. Resistors 55, 56, 57 and 58 connect the electrodes of diodes 20 and 24 to ground. The anode of tube 46 is connected to ground via a resistor 59 and condenser 60, which are connected in series and are shunted by a condenser 61.

In operation the tubes 9 and 10 serve as abovementioned as a multivibrator corresponding to the pulse generator 1 of Figure 1, said multivibrator serving to generate pulses which are applied to the delay line 16 and which are also applied via condenser 23 and diode 24 to the control electrode of tube 26. At a suitable time T after the generation of said pulse the pulse appears at the tapping 17 and is fed to the line scanning circuit to serve as a control pulse therefor and after a further and equal interval of time T the pulse appears at the tapping 18 and is fed via condenser 19 and diode 20 to the control electrode of tube 22. Delay line 16 at intervals of time T provides reflected pulses which together with the directly formed pulses forms pulses of the form shown in Figure 2. The central pulse 2 in Figure 2 is the control pulse which appears at tapping 17 and which is fed to the line scanning circuit and the pulses 3 and 4 are the additional pulses which are fed respectively to the control electrodes of tubes 22 and 26. The diodes 20 and 24 serve to eliminate unwanted pulses which would otherwise be transmitted to the tubes 22 and 26 from the line 16 following reverse transitions of the multivibrator. The line synchronising pulses, which are derived from the received television signals in any suitable manner are fed to the control electrode of tube 27 by which they are amplified, and the amplified pulses are applied to the cathodes of tubes 22 and 26. The relative timing of the pulses applied to the cathodes and control electrodes of tubes 22 and 26 is also represented by Figure 2, if the central pulse be regarded as representing the synchronising pulse, and in the normal operation of the circuit the waveform of the synchronising pulse is disposed centrally between the waveforms of pulses 3 and 4 as shown so that the control pulse fed to the line scanning circuit is in synchronism with it. Under these conditions pulses of equal magnitude appear at the anodes of tubes 22 and 26, and are fed to the cathodes of diodes 37 and 40, which are thereby caused to conduct to the same extents. The outputs of the diodes comprise pulses which are smoothed by the resistor and condenser networks 41, 43 and 42, 44 and are fed to the respective control electrodes of tubes 46 and 48, which amplify the pulses and serve as a comparison circuit such that the pulse amplitude at the anode of tube 46 varies about a mean value in magnitude and sign in accordance with the difference between the outputs of diodes 37 and 40. The output of tube 46 is integrated by the networks 59, 60 and the resulting voltage which serves as a frequency control voltage which is applied to resistor 52 and, via resistors 53 and 54, to the control electrodes of tubes 10 and 9 respectively, thereby controlling the frequency of the pulses generated by said tubes. When the outputs of diodes 37 and 40 are equal the said frequency control voltage has a value, which is set by adjustment of resistor 49 such that the multivibrators 9, 10 operates at the desired frequency. If for any reason the frequency of the multivibrator should vary, the control pulses will lead or lag behind the synchronising pulses, with the result that the waveforms of the additional pulses will be shifted relatively to the waveforms of the synchronising pulses, and the condition shown in Figure 2 will no longer obtain. Accordingly, upon the occurrence of each pair of additional pulses and the associated synchronising pulse, pulses of unequal magnitudes will appear at the anodes of tubes 22 and 26, and the diodes 33 and 40 will be caused to conduct to different extents and their outputs will be dissimilar. Accordingly, the pulse amplitude at the anode of tube 46 and the frequency control voltage will be varied in one sense or the other according to whether the frequency of the multivibrator has increased or decreased, and the control electrode voltages of tubes 9 and 10 will be similarly varied with the result that the frequency of the multivibrator will be decreased or increased as required until the condition shown in Figure 2 is again achieved in which the waveform of the synchronising pulse is centrally disposed relative to the waveforms of the additional pulses so that the control pulses are again synchronised with the synchronising pulses. The variable resistor 52 in the multivibrator for adjustment of the timing of the reverse transitions of the multivibrator can be used for obtaining variations of interlace as described in the specification of my co-pending United States application Serial No. 216,297, filed March 19, 1951.

In the embodiment of the invention illustrated in Figure 4 the control pulses and additional pulses are generated not by a multivibrator as in Figure 3 but by a blocking oscillator comprising an electron discharge tube 62 the control electrode and screen electrode of which are inductively coupled by windings 63 and 64, the anode and screen electrode being connected via resistors 65 and 66 respectively to a positive H. T. terminal 67. The cathode of tube 62 is connected to one end of a delay network 68, from a suitable tapping 69 of which control pulses are derived and are applied to the line scanning circuit of the receiver. The blocking oscillator is arranged to operate at line frequency and in operation pulses are set up at the ends of the delay network 68, by the current in the tube 62 when it is unblocked, these pulses having approximately the duration of a normal line synchronising pulse. The pulses so produced serve as the above-mentioned additional pulses which respectively lead and lag the control pulses, and said additional pulses are applied respectively to the control electrodes of electron discharge tubes 70 and 71, which are provided with a common envelope and the cathodes of which are connected to a negative voltage terminal via a resistor 72. The pulse applied to the control electrode of tube 70 produces an amplified pulse at the anode of said tube and an amplified pulse of opposite polarity at the anode of tube 71 and likewise the pulse applied to the control electrode of tube 71 produces an amplified pulse at the anode of tube 71 and an amplified pulse of opposite polarity at the anode of tube 70, so that at the anodes of tubes 70 and 71 paraphase groups of pulses are produced periodically, each group at the anode of tube 70 comprising a negative pulse followed by a positive pulse and the group at the anode of tube 71 comprising a positive pulse followed by a negative pulse. The groups of pulses are fed to the cathodes of a pair of diodes 73 and 74 via condensers 75 and 76. The received line and frame synchronising signals, after separation from the picture signals are applied with positive polarity via a co-axial feeder 77 to the cathode of an electron discharge tube 78, whereby the pulses are amplified, and a short-circuited delay network 79 in the anode circuit of tube 78, whose delay time is one half the duration of a line synchronising pulse, serves to shorten the frame synchronising pulses so as to make frame synchronising pulses of the same duration as the line synchronising pulses. The pulses are fed via a blocking condenser 80 and leak resistor 80′ to the control electrodes of a pair of electron discharge tubes 81 and 82 which are provided with a common envelope and the cathodes of which are connected to ground via a resistor 83, and which are biassed at their control electrodes just to cut off so as to eliminate negative going pulses set up at the anode of tube 78 by reflection from 79 after the trailing edges of the synchronising pulses has occurred, whereby in response to each synchronising pulse a pulse of negative polarity appears at the anode of each of the tubes 81 and 82. Said pulses are fed to the cathodes of the diodes 73 and 74, which serve as mixers whereby the pulses from tubes 81 and 82 are combined with the pulses from tubes 70 and 71. During normal operation of the blocking oscillator equal voltages are applied to the cathodes of diodes 73 and 74, the load circuits of which are formed by the resistance-condenser networks 84 and 85, but if the frequency of the blocking oscillator comprising tube 62 should vary from the frequency which is required to maintain the control pulse exactly mid-way in time between the additional pulses the negative pulses from diodes 81 and 82 will overlap to a greater extent the positive or negative pulses as the case may be of the groups of pulses from tubes 70 and 71 and the diodes 73 and 74 will thereupon provide different outputs. Said outputs are applied to the control electrodes of a pair of electron discharge tubes 86 and 87 the cathodes of which are connected via resistors 88 and 89 in series to a negative voltage terminal and the anodes of which are connected to positive terminal 67 via resistors 90 and 91 respectively. The anode of tube 87 is connected to ground via a by-pass condenser 92 and the anode of tube 86 is connected to the control electrode of tube 62. Tubes 86 and 87 serve to amplify the outputs of diodes 73 and 74 and also serve as a comparison circuit whereby the pulse amplitude at the anode of tube 86 varies above or below a mean value according to the departure of the frequency of the blocking oscillator from the desired frequency. Network 93 is provided to control the response of the complete circuit loop to variations of phase of the received synchronizing pulses. The output of tube 86 varies the frequency of the blocking oscillator in such manner that as the phase of the received synchronising pulses varies, the bias applied to its control electrode varies in such manner as to restore the phase relatively to the desired value.

In addition to the control pulses derived from the tapping 69 of the delay network 68 and which are employed for controlling the line scanning circuit of the receiver a sawtooth voltage of relatively large amplitude is generated at the anode of tube 62 which may if desired be employed for the purpose described in the specification of co-pending United States application Serial No. 216,297 or for driving a conventional line scan output stage.

The arrangement described with reference to Figure 4 has the advantage that the blocking oscillator can serve the dual purpose of generating the control pulses and also a sawtooth waveform. The delay network 79 reduces the frame synchronising pulses to a width of the order of half the line synchronising pulse width, thereby maintaining a more constant direct current component in the mixed synchronising signal waveform despite transmission through coupling condensers. In addition the pulse shape can be rendered of the same form as the pulses obtained from 68 since the two networks may be of similar design.

In the arrangement shown in Figure 4 the employment of balanced pairs of tubes 73, 74 and 86, 87 respectively is not essential although it has the advantage of not needing such a high H. T. voltage as the series arrangement of Figure 3; the frequency of the oscillator 62 may be controlled merely by determining the wave-shape of one pair of pulses, say from the anode of tube 70, and the added synchronising pulse. In this case one tube of the pair 86 and 87 may be used as the oscillator tube, say the tube 87, in which case the winding 63 of the blocking oscillator transformer would be connected in the anode lead of the tube 87 and the output of the integrating circuit 93 applied to the leak resistor for the control electrode of the tube 87. Moreover, the delay network 79 may be replaced by a differentiating circuit arranged to set up positive and negative pulses of short duration on the occurrence respectively of the leading and trailing edges of the current pulses in the tube 78.

In some types of television receiver the parts of the received signals which follow the synchronising pulse and which correspond to black are employed as a reference voltage level for the purpose of establishing the absolute brightness of the reconstituted image. Where such a receiver incorporates a circuit according to the invention the additional pulses which lag behind the synchronising pulses and which therefore occur during the said parts of the received signals may be employed to operate a gating device whereby the said parts of the signal are fed to a black level clamping circuit.

What I claim is:

1. A circuit for synchronizing the generation of pulses with the aid of received synchronizing pulses, comprising a free running oscillator, an output circuit for said oscillator including delay means for setting up pairs of time-spaced pulses having the frequency of said oscillator, a discriminator responsive to the time relationship of received synchronizing pulses and said pairs of pulses to produce a variable control signal, means for applying received synchronizing pulses to said discriminator, coupling means from said output circuit to said discriminator for applying said pairs of pulses to said discriminator, and a coupling from said discriminator to said oscillator to control the frequency of said oscillator in response to said control signal to maintain received synchronizing pulses intermediate the first and second pulses of said pairs of pulses.

2. A circuit for synchronizing the generation of pulses with the aid of received synchronizing pulses, comprising a free running oscillator, an output circuit for said oscillator including delay means for setting up pairs of time-spaced pulses having the frequency of said oscillator, a discriminator responsive to the time relationship of received synchronizing pulses and said pairs of pulses to produce a variable control signal, means for applying received synchronizing pulses to said discriminator, coupling means from said output to said discriminator for applying said pairs of pulses to said discriminator, a coupling from said discriminator to said oscillator to control the frequency of said oscillator in response to said control signal to maintain received synchronizing pulses intermediate the first and second pulses of said pairs of pulses, means for deriving further pulses from said oscillator output circuit with each further pulse intermediate the first and second pulses of a pair of pulses, and means for applying said further pulses to synchronize said scanning circuit.

3. A circuit for synchronizing the generation of pulses with the aid of received synchronizing pulses, comprising a free running oscillator, an output circuit for said oscillator including delay means for setting up pairs of time-spaced pulses having the frequency of said oscillator, first and second electron discharge tubes each having an output electrode, a control electrode and a cathode, a third electron discharge tube having an output electrode, a control electrode and a cathode, circuit connections connecting the output electrode of said third tube to the cathodes of said first and second tubes with the output electrode-to-cathode path of said third tube common to the cathode circuits of said first and second tubes, means for applying the first pulse of each pair of pulses from said output circuit to the control electrode of said first tube, means for applying the second pulse of each pair of pulses from said output circuit to the control electrode of said second tube, means for applying received synchronizing pulses to the control electrode of said third tube, a second output circuit connected to the output electrode of said first tube, a third output circuit connected to the output electrode of said second tube, means for comparing the outputs of said second and third output circuits to produce a control signal, and a coupling from said last-mentioned means to said oscillator to control the frequency of said oscillator in response to said control signal to maintain received synchronizing pulses intermediate the first and second pulses of said pairs of pulses.

4. A circuit for synchronizing the generation of pulses with the aid of received synchronizing pulses, comprising a free running oscillator, an output circuit for said oscillator including delay means for setting up pairs of time-spaced pulses having the frequency of said oscillator, first and second electron discharge tubes each having an output electrode, a control electrode and a cathode, a coupling impedance common to the cathode circuits of said tubes, means for applying the first pulse of each pair of pulses from said output circuit to the control electrode of said first tube, means for applying the second pulse of each pair of pulses from said output circuit to the control electrode of said second tube, a second output circuit connected to the output electrode of said first tube, a third output circuit connected to the output electrode of said second tube, means for injecting received synchronizing pulses to each of said second and third output circuits, means for comparing the outputs of said second and third output circuits to produce a control signal, and a coupling from said last-mentioned means to said oscillator to control the frequency of said oscillator in response to said control signal to maintain received synchronizing pulses intermediate the first and second pulses of said pairs of pulses.

5. A circuit for synchronizing the generation of pulses with the aid of received synchronizing pulses, comprising a free running oscillator, an output circuit for said oscillator including delay means for setting up pairs of time-spaced pulses having the frequency of said oscillator, first and second electron discharge tubes each having an output electrode, a control electrode and a cathode, a coupling impedance common to the cathode impedances of said tubes, means for applying the first pulse of each pair of pulses from said output circuit to the control electrode of said first tube, means for applying the second pulse of each pair of pulses from said output circuit to the control electrode of said second tube, a second output circuit connected to the output electrode of said first tube, a third output circuit connected to the output electrode of said second tube, means for injecting received synchronizing pulses to like electrodes of said first and second tubes, means for comparing the outputs of said second and third output circuits, and a coupling from said last-mentioned means to said oscillator to control the frequency of said oscillator in response to said control signal to maintain received synchronizing pulses intermediate the first and second pulses of said pairs of pulses.

References Cited in the file of this patent

UNITED STATES PATENTS

| Number | Name | Date |
|---|---|---|
| 2,201,978 | Bedford | May 28, 1940 |
| 2,277,000 | Bingley | Mar. 17, 1942 |
| 2,468,703 | Hammel | Apr. 26, 1949 |
| 2,577,536 | MacNichol | Dec. 4, 1951 |